(12) United States Patent
Krüger et al.

(10) Patent No.: US 6,708,562 B2
(45) Date of Patent: Mar. 23, 2004

(54) LEVEL GAUGE FOR OIL-FILLED TRANSFORMERS, CHOKES AND TAP CHANGERS

(75) Inventors: Werner Krüger, Reichelsheim (DE); Karsten Viereck, Regenstauf (DE)

(73) Assignee: Messko Albert Hauser GmbH & Co. KG, Oberursel (DE)

( * ) Notice: Subject to any disclaimer, the term of this patent is extended or adjusted under 35 U.S.C. 154(b) by 23 days.

(21) Appl. No.: 10/299,375

(22) Filed: Nov. 19, 2002

(65) Prior Publication Data

US 2003/0094044 A1 May 22, 2003

(30) Foreign Application Priority Data

Nov. 22, 2001 (DE) .......................................... 101 57 148

(51) Int. Cl.[7] .............................................. G01F 23/30
(52) U.S. Cl. ...................... 73/314; 73/290 R; 73/305; 73/313; 73/321; 340/623
(58) Field of Search .......................... 73/290 R, 305, 73/317, 314, 313, 321; 340/623

(56) References Cited

U.S. PATENT DOCUMENTS

| | | | | |
|---|---|---|---|---|
| 4,147,060 A | * | 4/1979 | Fling et al. ..................... | 73/321 |
| 4,688,028 A | * | 8/1987 | Conn .......................... | 340/625 |
| 4,804,944 A | * | 2/1989 | Golladay et al. ........... | 340/624 |
| 5,265,032 A | | 11/1993 | Patel ........................... | 364/509 |
| 6,564,632 B2 | * | 5/2003 | Ross, Jr. ...................... | 73/317 |
| 6,584,838 B2 | * | 7/2003 | Lorenzen ..................... | 73/314 |

* cited by examiner

*Primary Examiner*—Hezron Williams
*Assistant Examiner*—Rodney Frank
(74) *Attorney, Agent, or Firm*—Herbert Dubno

(57) ABSTRACT

A liquid level indicator for an oil-filled transformer, power choke or tap changer in which a sensor part has a float which rises and falls with the oil level and rotates a sensor shaft and the sensor shaft is coupled to an indicator shaft on which a pointer is provided to cooperate with a dial. The gauge also includes a contactless angle encoder operating with a magnetic hub and coupled to the indicator shaft for outputting a signal representing the oil level.

7 Claims, 3 Drawing Sheets

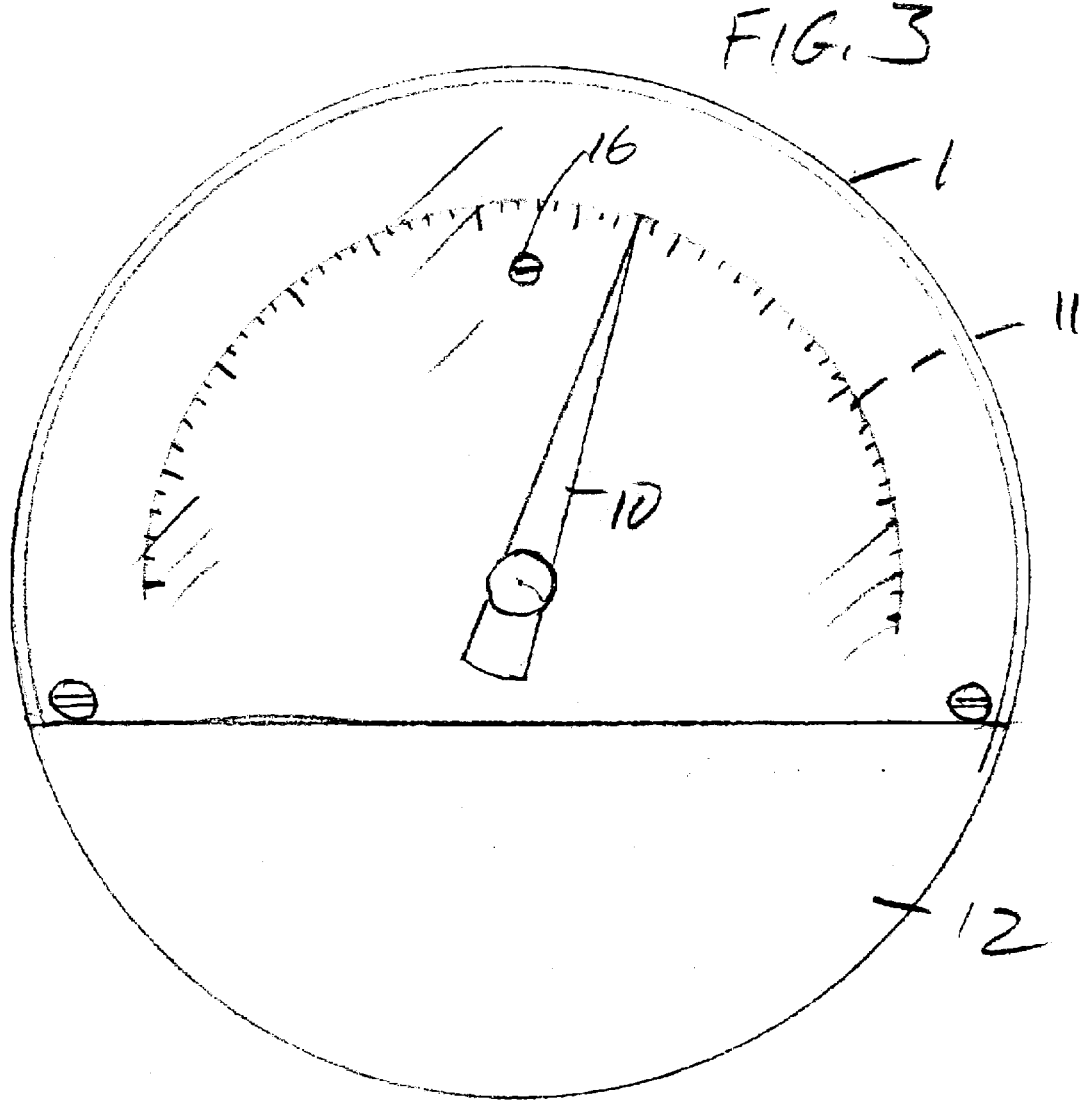

LEVEL GAUGE FOR OIL-FILLED TRANSFORMERS, CHOKES AND TAP CHANGERS

FIELD OF THE INVENTION

The present invention relates to an oil level gauge for oil-filled electrical power equipment. More particularly, the invention relates to an oil gauge for the insulating or cooling oil for oil-filled electrical power equipment such as a power transformer, a choke or a tap changer and especially for the oil expansion vessel thereof into which oil flows during heating up of the electrical power apparatus and from which oil returns to the transformer or other electrical power apparatus as the oil contracts as the temperature drops.

BACKGROUND OF THE INVENTION

A magnetic oil level indicator of the MTO series is distributed by the assignee of this application and is described in a brochure identified as IN 185/02de-0401/1000. The oil level indicator is manufactured by the assignee (MESSKO Albert Hauser GmbH & Co. KG. This oil level indicator has a transmitter portion and an indicator portion which can be separably interconnected. The sensor unit comprises an oil-type or sealed flange plate and is installed directly in the wall of the oil-containing vessel. A float arm transfers the rise and fall of the oil in the vessel and on which the float rides to a spindle or shaft. This spindle is connected by a magnetic clutch with a display spindle or shaft in the display portion of the unit and the latter spindle operates a pointer which rides over a dial face. The display unit can additionally be equipped with one or two microswitches or sensitive switches which output an electric signal upon reaching a minimum "min" or maximum "max" position. The display is equipped, therefore, with both an optical read-out of the instantaneous filling state by means of the pointer and scale and an electrical unit which can provide an input for a control system via the electrical signal output at certain filling states, for example by means of the sensitive switch.

Another level indicator is available which produces a continuous analog electric signal as a measure of the degree of filling. In this case, the indicator shaft in the display part of the unit is connected with a potentiometer. The measured state of filling is converted into an angular displacement of the shaft of the potentiometer which supplies an analog signal representing the liquid level. A drawback of this level indicator is that the contact in the potentiometer is a mechanical slide contact which rides upon a circular conductor track and in many instances the wiper contact and its conductive track contribute problems of wear, problems of contamination when, for example, the contacts are not relatively moved frequently and even problems of film formation and modified contact resistance when the system is exposed to aggressive media or even air for prolonged periods.

OBJECTS OF THE INVENTION

It is, therefore, the principal object of the present invention to provide an improved liquid level detector especially applicable to the measurement of the oil level of an oil-filled electrical power apparatus, whereby drawbacks of the earlier system are avoided.

Another object of the invention is to provide an electrical level detector which can be used in the oil expansion reservoir, of, for example, a power transformer, an electric power choke or an electric power tap changer which does not suffer change with time even though the use may be infrequent and which can provide a continuous measure of the oil level.

SUMMARY OF THE INVENTION

These objects and others which will become apparent hereinafter are attained, in accordance with the invention in an oil level indicator for the oil expansion vessel of an electric power transformer, choke or tap changer in which a float is operatively connected to a float rod and which converts the lifting movement of the float to the rotation of a shaft of an angle encoder whose input member is operatively connected with the shaft and preferably with a shaft carrying an indicator or pointer which rides on or over a scale. According to the invention the angle encoder is of an electromagnetic type having a magnetic hub which cooperates with a contactless pick-up in the form of a Hall element with integrated ASIC to form an ASIC Hall sensor, converting the position of the magnetic actuator into an absolute incremental or sine-cosine output signal.

According to a feature of the invention, the angle indicator is coupled with the shaft driven by the float with belt coupling, the shafts of the encoder and the float system having respective wheels around which the belt passes. The belt may be any conventional coupling belt or endless element such as a cog belt, a chain or other flexible member connecting the driven shaft and wheel with the driving shaft and wheel.

The system of the invention allows a miniature angle encoder to be used as the contactless angle sensor and which is free from wear and is completely free from the effects of contact film formation and contamination of mutually sliding surfaces. the miniature angle encoder can be any of those marketed under the designation RXM22, for example of the firm TWK Electronik GmbH, Düsseldorf, Germany and described in the brochure "ELEKTROMAGNETISCHE WINKELCODIERER UND IMPULSGEBER" for the models RBM of the same firm. Reference may be made to the brochure RXM10937BE* of April, 2002 obtainable from the web site of this company.

As far as we know, such encoders have never been utilized for electric power equipment and especially not in conjunction with float sensors for the oil level in an expansion tank of an oil-filled transformer, choke or tap changer although they appear to have been used for other purposes in conjunction with automotive technology. The unit has a flange and a housing of aluminum, a magnetic hub with north and south poles and journal structures of stainless steel to receive a shaft. The detection of the angular position is effected by means of a Hall sensor which is integrated together with the signal processor on an ASCIC and can be juxtaposed with the magnetic hub so that no moving part requires contact with a wiper or, conversely, has a wiper which must engage a stationary contact part.

BRIEF DESCRIPTION OF THE DRAWING

The above and other objects, features, and advantages will become more readily apparent from the following description, reference being made to the accompanying drawing in which:

FIG. 3 is a front view of the apparatus with the dial, pointer and shield in place.

SPECIFIC DESCRIPTION

Figure 1:
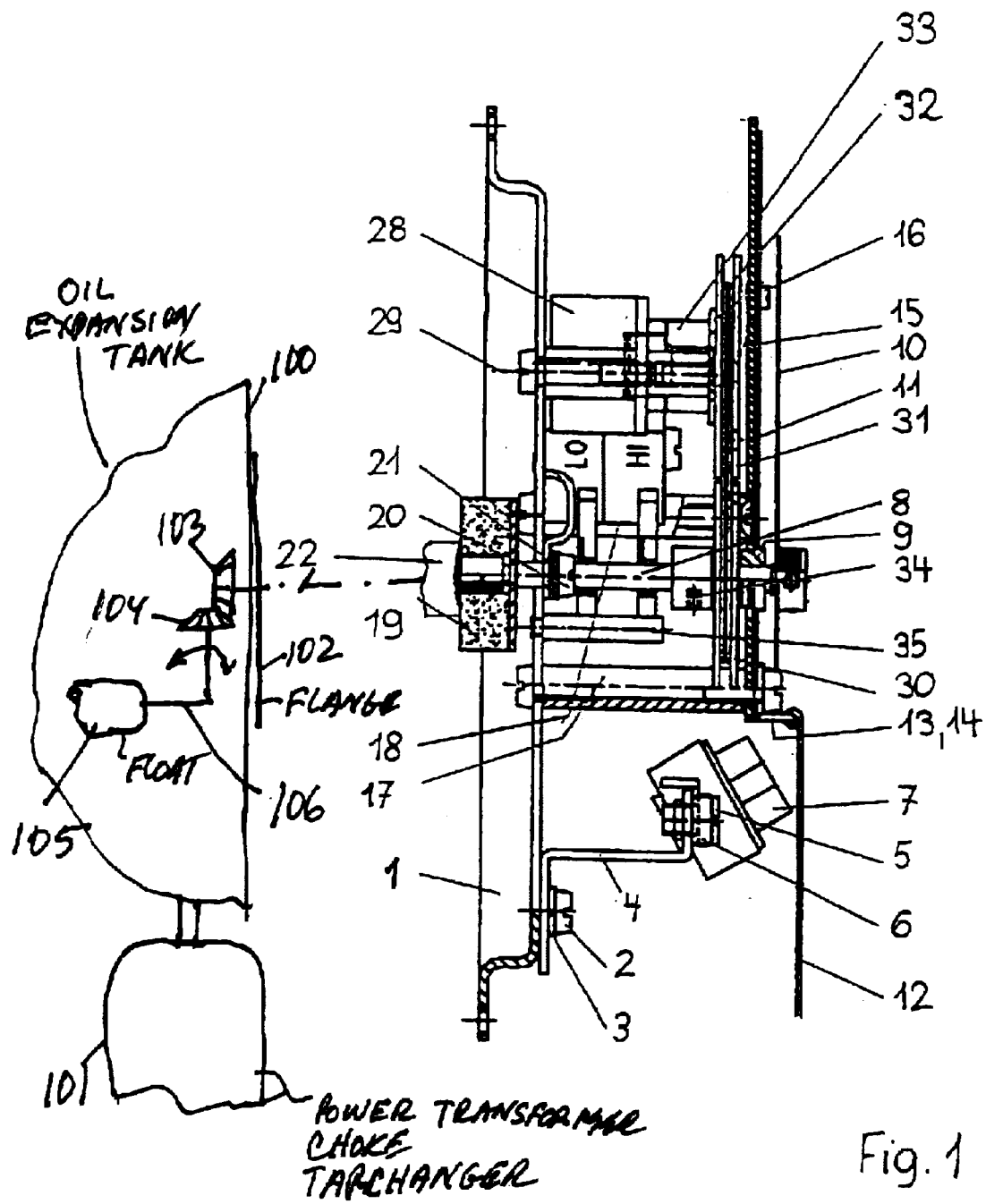
FIG. 1 is a vertical section through a liquid level indicator, in somewhat schematic form.
Figure 2:
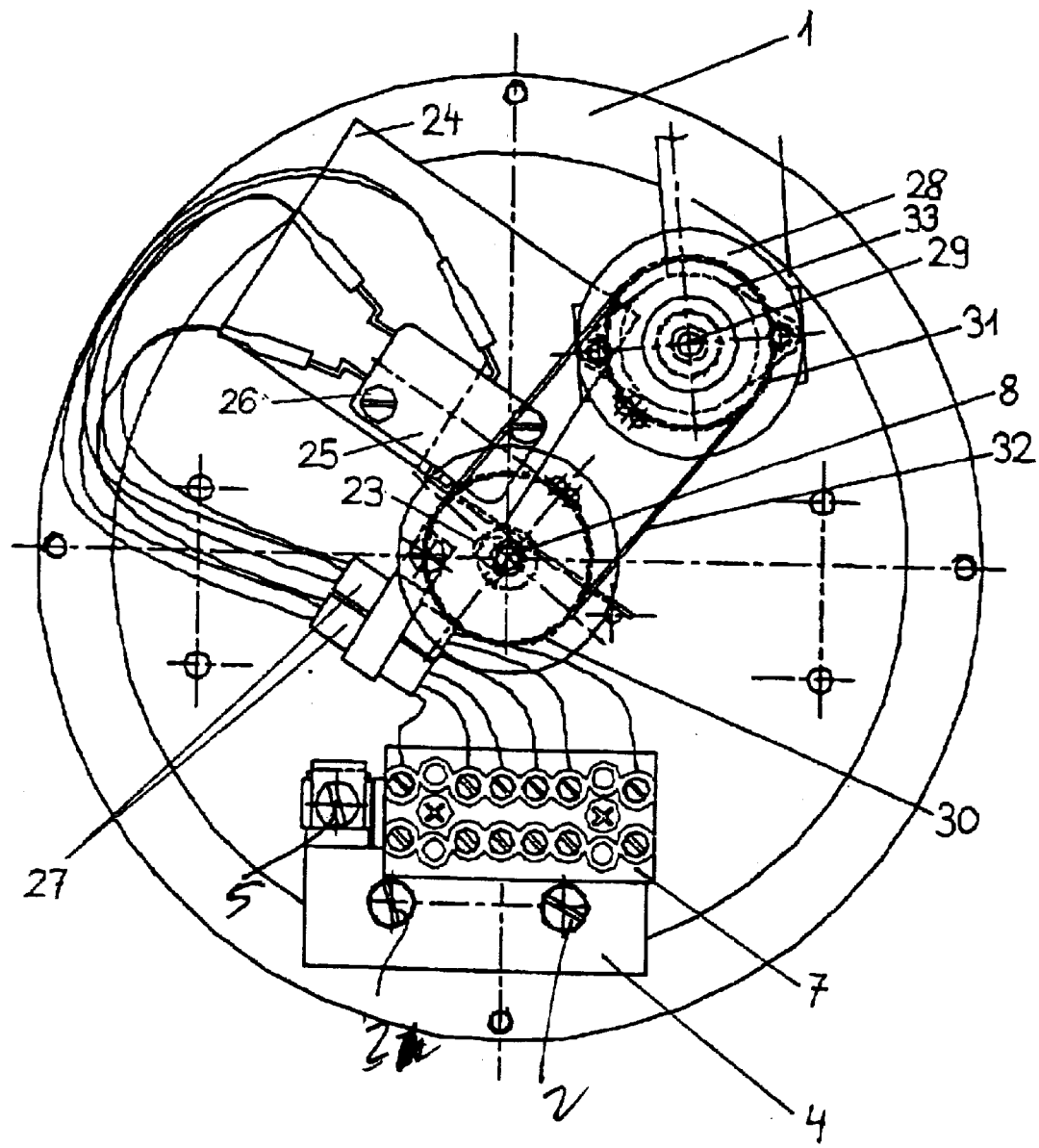
FIG. 2 is a diagrammatic front view of a portion of that level indicator with the dial, pointer and shield removed.

As can be seen from FIG. 1, the level detector or gauge of the invention is preferably to be used to measure the liquid level in an expansion vessel or tank 100 which can be connected to an electric power apparatus 101 which can be connected to an electric power apparatus 101 such as a power transformer, choke or tap changer which is filled with oil.

The portions of the level gauge which are similar to those of the art and for example the MTO series mentioned previously, have been shown only diagrammatically in the drawing and can include a flange 102 which is mounted on the wall of the tank 100, a shaft 22 which forms part of the sensor of the gauge and can have, for example, a bevel gear 103 affixed thereto, another bevel gear 104 meshing with the bevel gear 103 and driven by a float 105 which can raise and lower in the vessel 100, assuming that the liquid level rises and falls therein perpendicular to the plane of the paper in FIG. 1 and any rod represented only diagrammatically at 106 which can couple that float to the gearing and thus cause rotation of the shaft 22 as the liquid level rises and falls.

The oil-filled unit 101 can be a power transformer, a choke or a tap changer by way of example and the oil expansion tank 100 may receive oil as the temperature rises in the electric power unit and allow the level of the oil to recede as the temperature drops, i.e. with the expansion and contraction of the oil.

The indicator part of the apparatus comprises a base plate 1 which can carry the entire oil-level gauge and can have screws 2 which secure a bracket 4 thereto. Spring washers 3 lock the screw in its tightened position. The bracket 4 has a clamping screw 5 attaching a cable guide 6 to the bracket and a terminal block 7 can be mounted thereon to make the connections for the electrical conductors of the gauge. Centrally through the apparatus extends a rotatable indicator shaft 8 which is journaled in the axial bearings 9 and at one end carries the pointer 10 cooperating with the dial 11 having appropriate level markings. Below the dial 11 the front side of the gauge is closed by a shield 12. At the upper region of the shield 12 hinge springs 13 and 14 are provided to allow the shield to be swung up and to afford access to the terminal block 7. For fastening the dial 11 onto the dial carrier 15, a screw 16 is provided. For fastening the dial carrier 15 to the base plate 1, bolts 17 and 18 are used.

At the opposite end of the indicator shaft 8 there is a magnetic clutch 19 which is secured by a screw 20 and a spring washer 21. The magnetic clutch is provided between the indicator shaft 8 and the float operated shaft 22. In addition, the indicator shaft 8 has switching cams 23 which cooperate with microswitch 25 mounted on a separate insulating plate to output minimum and maximum signals when the dial reaches its respective end position. The microswitch is fixed in place by a screw 26 and an insulating sleeve 27 is provided for the electrical conductors. The system is provided with angle encoder 28, e.g. of the type RBM 22 of TWK Elektronik GmbH and which is coupled with the indicator shaft 8. Preferably the angle encoder 28 has its shaft 29 mounted parallel to the indicator shaft 8 and is coupled to it by a belt drive formed by wheels or pulleys 30 and 31 on the indicator shaft 8, the shaft of the angle encoder 28, respectively.

The connection of the two pulleys is effected by a cog belt, a scale wire, a chain or the like as represented at 32. The angle encoder thus outputs an analog signal representing the rotation of the indicator shaft 8 and representing the level of liquid in the vessel 100. The output can be of the sine-cosine type and further processing of the output from the ASIC can be effected by an RS485 interface.

The rotary movement of the wheel 31 is applied to a magnetic hub 33 in the magnetic encoder and thus is not via mechanical contact but rather through the contactless detection with the Hall sensor.

We claim:

1. A liquid-level indicator for an oil-filled electric power apparatus, said liquid-level indicator comprising:

a sensor part mounted on a wall of a vessel in which an oil level is to be measured and having a float rising and falling with said level, and a sensor shaft operatively connected with said float and angularly displaceable thereby;

a display part operatively connected to said sensor part and adapted to display the level in said vessel, said display part comprising an indicator shaft coupled with said sensor shaft, a pointer mounted on said indicator shaft and a display cooperating with said pointer;

an angle encoder operatively connected with said indicator shaft and having a magnetic hub and a Hall sensor cooperating contactlessly with said hub and in an ASIC providing an output representing angular displacement of said indicator shaft and said level in said vessel; and a flexible transmission between said indicator shaft and said sensor shaft.

2. The liquid-level indicator defined in claim 1 wherein said transmission comprises a wheel on said sensor shaft, a wheel on said indicator shaft and an endless flexible element connecting said wheels.

3. The liquid-level indicator defined in claim 2 wherein said endless flexible element is a belt, cog belt, chain or scale wire.

4. The liquid-level indicator defined in claim 3 wherein said vessel is an oil expansion vessel of said apparatus.

5. The liquid-level indicator defined in claim 4 wherein said apparatus is an electric power transformer.

6. The liquid-level indicator defined in claim 4 wherein said apparatus is an electric power choke.

7. The liquid-level indicator defined in claim 4 wherein said apparatus is an electric power tap changer.

* * * * *